United States Patent
Prasad et al.

(10) Patent No.: US 12,169,631 B2
(45) Date of Patent: Dec. 17, 2024

(54) BASED ON IO PATTERN INFLUENCE NFIT TABLE FOR PERSISTENCE FOR SCM FIRMWARE

(71) Applicant: EMC IP Holding Company LLC, Hopkinton, MA (US)

(72) Inventors: Parmeshwr Prasad, Bangalore (IN); Bing Liu, Tianjin (CN); Rahul Deo Vishwakarma, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 43 days.

(21) Appl. No.: 17/512,953

(22) Filed: Aug. 26, 2021

(65) Prior Publication Data
US 2023/0061948 A1 Mar. 2, 2023

(51) Int. Cl.
*G06F 3/06* (2006.01)
(52) U.S. Cl.
CPC .......... *G06F 3/0613* (2013.01); *G06F 3/0611* (2013.01); *G06F 3/0629* (2013.01); *G06F 3/0659* (2013.01); *G06F 3/0688* (2013.01)
(58) Field of Classification Search
CPC .... G06F 3/0613; G06F 3/0611; G06F 3/0629; G06F 3/0688; G06F 3/0659
See application file for complete search history.

(56) References Cited

U.S. PATENT DOCUMENTS

| | | | |
|---|---|---|---|
| 10,152,264 B1* | 12/2018 | Butcher | G06F 9/4401 |
| 2018/0095691 A1* | 4/2018 | Manvar | G06F 13/1694 |
| 2018/0329790 A1* | 11/2018 | Prasad | G06F 11/1435 |
| 2019/0095329 A1* | 3/2019 | Kumar | G06F 12/1009 |
| 2019/0171580 A1* | 6/2019 | Suryanarayana | G06F 12/0238 |
| 2019/0294352 A1* | 9/2019 | Prasad | G06F 12/0607 |
| 2020/0019311 A1* | 1/2020 | Zolotow | G06F 3/067 |

OTHER PUBLICATIONS

Barcelo, M.M., "NVDIMM and PMEM overview," Redhat, Oct. 2015, pp. 1-35.
Intel, "NVDIMM Block Window Driver Writer's Guide," Jul. 2016, pp. 1-38.

* cited by examiner

*Primary Examiner* — Eric Cardwell
(74) *Attorney, Agent, or Firm* — Workman Nydegger (57) ABSTRACT

One example method includes analyzing an IO pattern comprising IOs issued by a client application, based on the analyzing, generating a rule relating to an NFIT, using the rule to modify the NFIT, and after the NFIT is modified, changing a configuration of SCM firmware based on the NFIT. Because the modified SCM firmware may have a configuration directly related to the IO pattern, the SCM may function relatively more efficiently and effectively for that IO pattern.

18 Claims, 4 Drawing Sheets

BASED ON IO PATTERN INFLUENCE NFIT TABLE FOR PERSISTENCE FOR SCM FIRMWARE

FIELD OF THE INVENTION

Embodiments of the present invention generally relate to storage class memory (SCM). More particularly, at least some embodiments of the invention relate to systems, hardware, software, computer-readable media, and methods for determining an IO pattern so as to enable improved usage and operation of SCM.

BACKGROUND

Storage class memory (SCM) has become increasingly popular for a variety of applications. One particular example of SCM is NVDIMM (Non-Volatile Dual Inline Memory Module), which is a type of RAM (Random Access Memory). The NVDIMM may include DRAM (Dynamic Random Access Memory) as a memory cache and NAND flash memory as a data store to back the DRAM. While SCM has proven useful and effective in some circumstances, a number of challenges remain.

At least some of the challenges concern the fact that SCM firmware cannot be persistently modified to accommodate differing IO patterns. As a result, the SCM may not be utilized efficiently and effectively. More particularly, permanent changes that may be able to improve SCM performance are not possible in the SCM at runtime. Some of these changes concern SPA (System Physical Address) regions, block window locations, interleave and flush.

In more detail, with respect to SPA regions, a range of addresses accessible to IOs could be allocated to the client or application that generates the IOs. However such allocations cannot be implemented in the SCM firmware on a permanent basis and, as a result, the SPA region may have to be continually redefined. As another example, block window locations in the SCM for the writing of blocks, such as 64 KB blocks for example, may change on an ongoing basis rather than being fixed for a pattern of IOs that may recur. Thus, the block window locations may need to be changed or updated on an ongoing basis, even if the same IO pattern is seen over and over. In another example of problems concerning the modification of SCM firmware, a group of IOs may dictate a need to interleave a group of NVDIMMs so that, for an example group of IOs, equal fractions of data are written to each NVDIMM in the group. At present however, the SCM cannot be configured with permanent changes to the NVDIMM interleave set. In a final example, it may be useful in some instances to flush IOs to the NAND flash memory of an SCM so that those IOs can be persisted. The timing of flushes, such as WPQ flushes (Write Pending Queue flush—such as a mechanism utilized by a driver to flush an internal memory controller HW queues/buffers of write data destined to the NVDIMM) for example, may be the same for recurring patterns of IOs. However, the SCM flush must be reconfigured each time, even though the pattern of IOs may repeat.

At present, significant changes to the SCM firmware are only possible through firmware interfaces. The NFIT (NVDIMM Firmware Interface Table) is closely related to the SCM firmware. Thus, an IO must communicate with the NFIT to implement any changes to the SCM firmware. Moreover, the interleave configuration cannot be changed from the system firmware. If, for example, an IO or pattern of IOs required a change to an interleave mode, the IO would have to communicate with the NFIT. Finally, an IO specific flush is possible only through NFIT.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to storage class memory (SCM). More particularly, at least some embodiments of the invention relate to systems, hardware, software, computer-readable media, and methods for determining an IO pattern so as to enable improved usage and operation of SCM.

In one example embodiment, an IO pattern is identified and used as a basis for formulating a rule that will enable the IO pattern to communicate with an NFIT (NVDIMM Firmware Interface Table) associated with NVDIMM. The rule may be specific to the IO pattern and may directly influence the NFIT. In particular, a FIT (Firmware Interface Table) method may be used to change one or more entries of the NFIT to correspond with the IO pattern. In this, way, permanent, and IO pattern-specific, changes, may be implemented to the SCM firmware. Thus, the SCM firmware may be customized to suit recurring IO patterns. This customization may avoid the need for ongoing changes to support recurring IO patterns, and may thus improve the operation of the SCM firmware with respect to those IO patterns.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, one advantageous aspect of at least some embodiments of the invention is that SCM may be used more effectively and efficiently through persistent modifications of the SCM firmware to accommodate IO patterns originated by applications and clients. Various other advantages of example embodiments will be apparent from this disclosure.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, comprising, and/or relating to, SCM that may comprise or otherwise be associated with one or more NVDIMMs. The SCM may comprise hybrid storage that includes both memory and storage. As such, SCM may operate to enhance the capability of an NVDIMM (Non-Volatile Dual Inline Memory Module), which is a type of RAM (Random Access Memory), through the use DRAM (Dynamic Random Access Memory) as a memory cache and NAND flash memory as a data store to back the DRAM. Thus, in some example embodiments, SCM may be considered as comprising one or more NVDIMMs and flash memory, such as NAND flash memory. Any other SCM configuration may be employed however. Application IOs that comprise data may be written to the SCM. Further, an NFIT (NVDIMM Firmware Interface Table) may be employed which defines the information created by a BIOS to inform a client OS about the NVDIMMs in the system. For example, each NVDIMM may be associated with, comprise, or define, a software mechanism for managing a range of persistence on a NVDIMM, that is, a range of addresses of the NVDIMM where data may be persistently stored. Information about the persistence range, such as a start and end address for the persistence range, may be stored in a table of the NFIT. As disclosed elsewhere herein, an NFIT may be one of a group of tables included in, or otherwise associated with, an ACPI (Advanced Configuration and Power Interface) that may be used by management software to configure various aspects and elements of an SCM.

Figure 1:
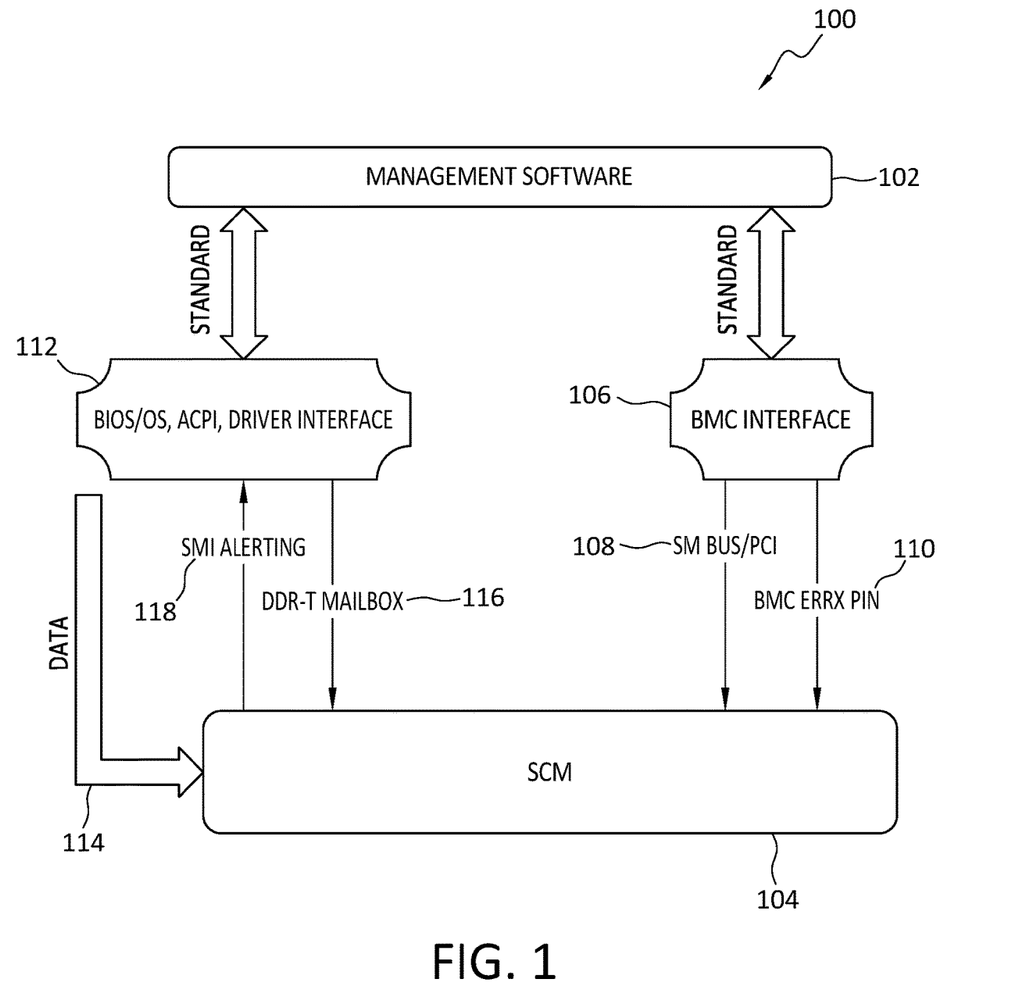
FIG. 1 discloses aspects of an example hardware configuration for some embodiments of the invention.

With reference now to FIG. 1, details are provided concerning some example management interfaces for SCM that may comprise one or more NVDIMMs. In the particular example architecture 100 of FIG. 1, management software 102, which may comprise one or more SCM management interfaces, may configured to communication with SCM 104 by way of various mechanisms and methods. Some of such methods/mechanisms may be in-band, and other methods/mechanisms may be OOB (Out of Band). The SCM may sit on a memory bus, along with other memory and/or storage units. Thus, a memory bus may be connected to a variety of different memory and storage devices, and access to the memory and storage devices for IOs may be obtained by way of the memory bus.

An example OOB interface may comprise a BMC (Baseboard Management Controller) interface 106 that may communicate with SCM 104 by way of connections such as an SMBus (System Management Bus—for low-speed system management communications)/PCI (Peripheral Component Interconnect) interface 108 and/or a BMC Errx Pin 110.

Example in-band interfaces 112 can be by way of BIOS (Basic Input/Output System), ACPI (Advanced Configuration and Power Interface), and Device Drive Interface. In general, the BIOS interface is responsible for bringing the SCM 104 up and provide some runtime and boot-time interfaces. This may be important to give life to the SCM 104 at very early time of power on. An OS (Operating System) of a computing entity includes interfaces such as ACPI and various device drivers. The ACPI may handle any power related and different other state of the SCM. As well, the ACPI may bridge between BIOS and the OS interface. As noted earlier, the ACPI may comprise multiple tables, such as an NFIT for example. These tables may help in managing and configuration of SCM devices. Most of the data package from CPU to SCM goes through DDRT mailboxes. This is the standard mechanism to send data to older DDR also. But there are some extension to support SCM. As well, the SCM 104 may have a BTT (Block translation table) driver in the OS which handles the block mode of read/write, and may also handle atomicity, that is, the granularity at which data can be written and/or read to/from the SCM, such as at the block level for example. Finally, the SCM 104 may provide SMI alerting, that is, storage management alerts, 118 to the in-band interface 112.

B. Aspects of Some Example Embodiments

In general, IO (Input/Output operations) patterns for IOs issued by an application to SCM, for example, typically change from one use case to another. For example, sometimes the IO patterns may comprise a byte stream, and in other cases, the IO patterns may comprise individual blocks of data, which may or may not have the same sizes.

SCM may support different access modes including, for example, memory mode access, storage mode access, and App-Direct mode access. These modes may correspond to the particular type of usage that is being made of the SCM, such as whether a storage capability, or a memory capability, of the SCM is being employed for an IO. These modes may also correspond to the portion of the SCM that is involved in an IO. Thus, for example, an IO directed to NAND flash memory of the SCM may use the storage access mode, while an IO directed to DRAM of the SCM may use the memory access mode. In the case of the App-Direct access mode, IOs may bypass a software stack of a computing device and may be written directly by an application to the SCM.

The SCM may be in different stages at different points. An NVDIMM that may be used in connection with some embodiments may be divided into logical units of storage, or namespaces. The namespaces may comprise persistent memory namespaces, and block mode namespaces. Each name space (NS) in the SCM, particularly in the NVDIMM of SCM, may provide optimal performance for a specific workload pattern from client applications. Note that in some embodiments, namespaces cannot overlap, although a namespace may, in a configuration referred to as an interleave, extend across multiple NVDIMMs. Further, a single NVDIMM may include multiple block mode namespaces.

Figure 2:
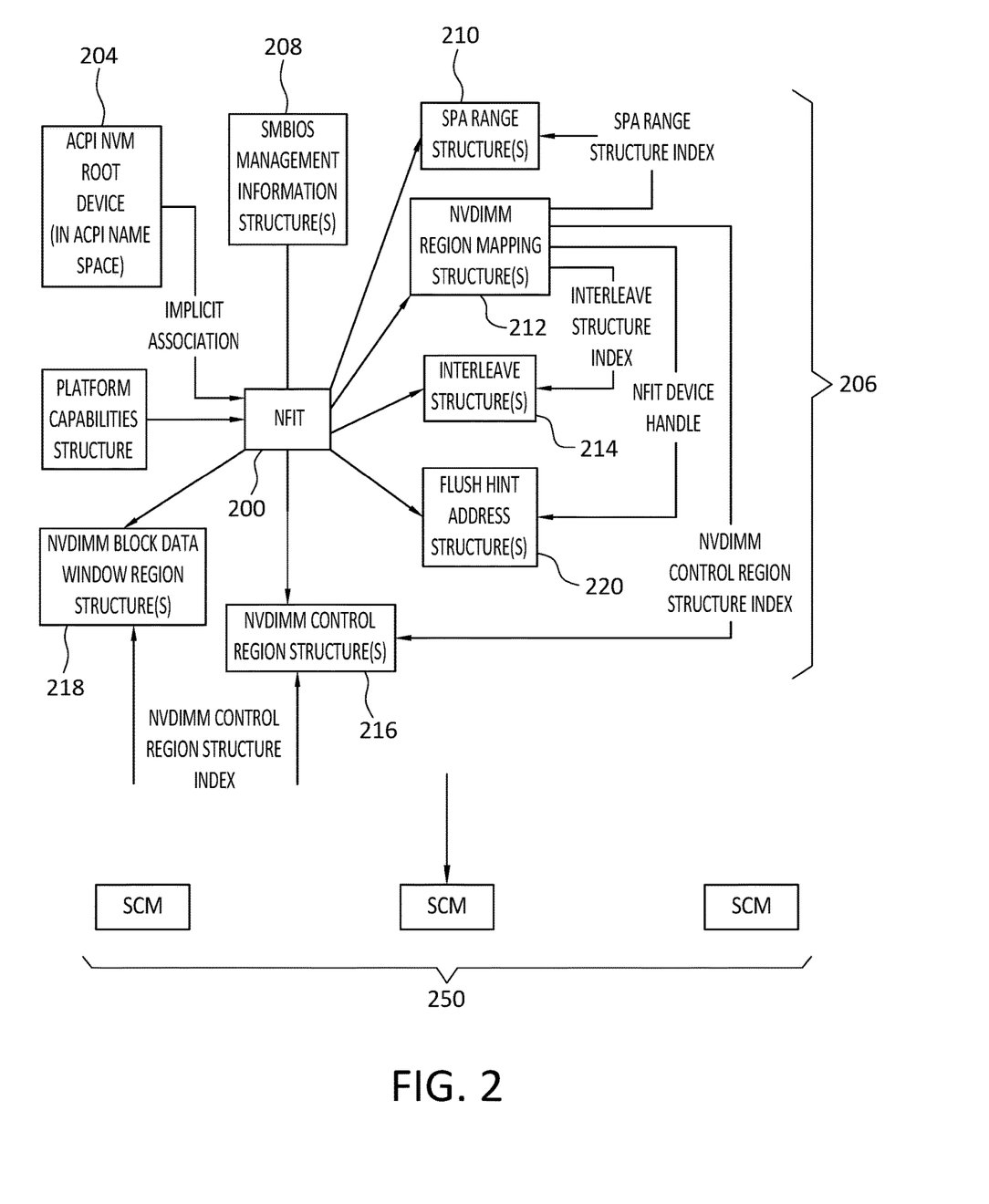
FIG. 2 discloses aspects of an example NFIT table.

With reference now to FIG. 2, details are provided concerning an example NFIT table 200 that may be employed in connection with one or more embodiments. As noted elsewhere herein, an NFIT table may be one of a group of tables included in an ACPI interface 204 that may be employed for managing and configuring one or more SCM devices 250. As indicated in FIG. 2, the NFIT may, in turn, expose various structures 206, each of which may correspond to, and identify, a particular aspect of the configuration and/or management of an NVDIMM. Any one or more of the structures 204 may be persistently modified pursuant to example embodiments of the invention. Modification of an NFIT structure, such as in response to detection and/or definition of a particular IO pattern, may result in a change to the configuration of the NVDIMM, and a corresponding change in the way that an IO pattern is handled by the NVDIMM.

Attention is directed now to the various example structures 206 of the example NFIT 200 that may be exposed when a change is to be made to the NFIT 200. The example structures 206 may include, for example, an SMBIOS management information structure 208 that includes information about a BIOS of an SCM. An SPA range structure 210 may define memory mapped region address, length, and properties. A 'Memory Device to System Address Range Map Structure' 212 may include NVDIMM memory device properties. An interleave structure 214 may defines interleaving properties associated with a NVDIMM. An NVDIMM control region structure 216 may include NVDIMM hardware identifiers, and block control window information. An NVDIMM block data window region structure 218 may include information concerning block level accesses of the NVDIMM. A flush hint address structure 220 may indicate addresses of data to be flushed by one or more pending flush operations. Finally, a platform capabilities structure 222 may include information about the capabilities of an NVDIMM such as, for example, read/write speed, memory capacity, and storage capacity.

Note that, with respect to the aforementioned NVDIMM block data window region structure 218, a block window may comprise set of registers including a command register, a status register, and an aperture allowing an NVDIMM driver to read and write blocks of data to any persistent area on an NVDIMM. Further, regarding the SPA range structure 210, SPA (System Physical Address) may comprise a physical address on the host operating system.

Finally, it is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

C. Example Methods

Figure 3:
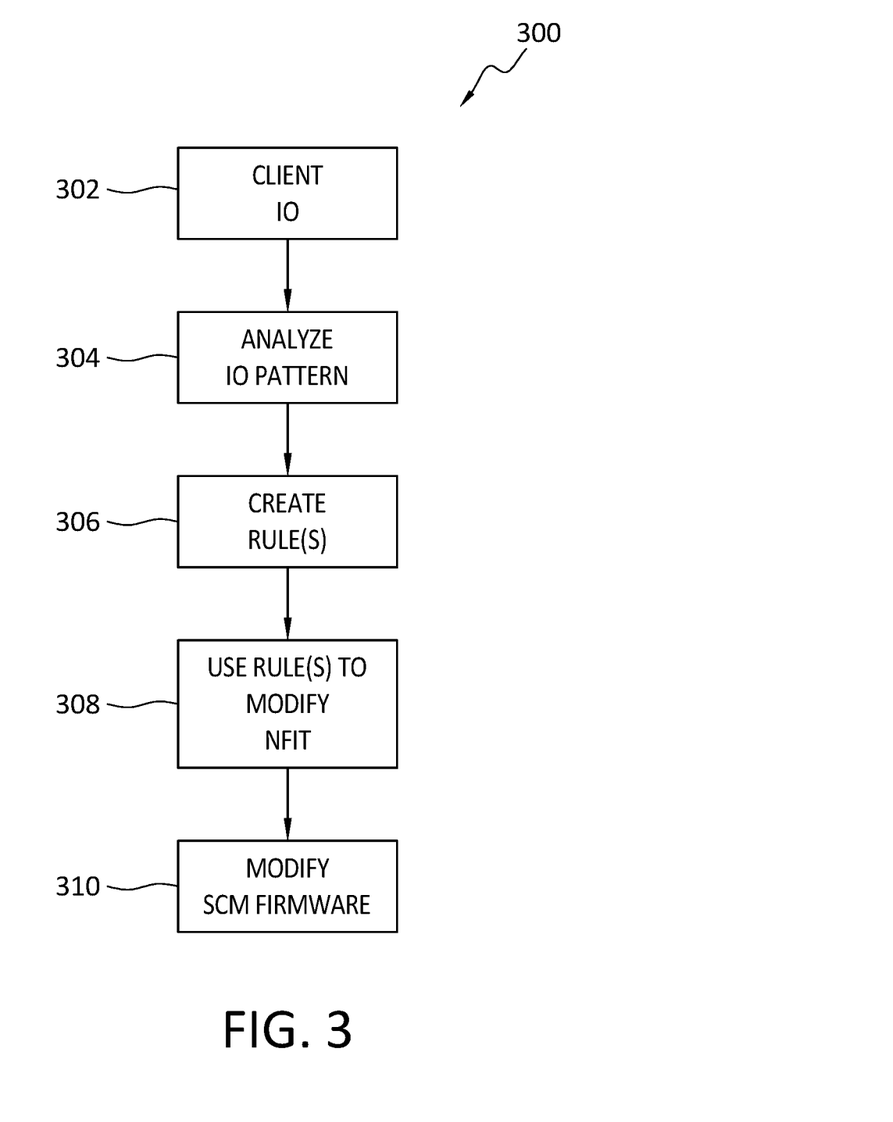
FIG. 3 discloses aspects of an example method for updating an NFIT table.

It is noted with respect to the example method of FIG. 3, as well as the other processes, operations, and methods disclosed herein, that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 3, an example method 300 is disclosed. In general, the method 300 may be performed in whole or in part by, and/or by way of, one or more entities such as, but not limited to, a user, a user console, an NVDIMM, SCM, and a user interface.

The method 300 may begin when a client IO, which may be issued by an application for example, is 302 predicted, or detected. That is, in some embodiments, an IO pattern for an application may be predicted based on past performance of the same, or similar, application. By using predicted IO patterns, the method 300 may be able to more quickly analyze 304 an IO pattern than if a predicted IO pattern was not used. However, the analysis 304 of an IO pattern may be performed using an actual IO pattern and/or a predicted IO pattern.

At 306, one or more rules may be created, based on analysis of the observed IO pattern and/or predicted IO pattern. In general, the rules may indicate how the NFIT and, thus, the SCM, is to be modified when a particular IO pattern is employed. As such, the rules may be generated 306, automatically in some embodiments, in response to detection and/or analysis of an IO pattern. The rules may be persistently stored and modified and/or deleted at some future time. A particular rule may apply only to a single IO pattern, or to a group of IO patterns that may or may not be similar to each other. In some embodiments, a rule may be specific to a particular application, although that is not necessarily required.

After the one or more rules have been generated 306, they may be used to modify 308, possibly automatically, the NFIT associated with SCM. The NFIT may be modified immediately after generation 306 after the rules, or during a pause or stop of application operations that were the basis for generation of the rules. After the NFIT has been modified 308, the SCM firmware to which the NFIT corresponds may be modified 310 to reflect the changes to the NFIT. The modifications may correspond to one or more changes to any one or more of the NFIT structures that were made 308 based on the rule(s) generated 306.

These modifications 310 to the SCM firmware may be persistent and may remain in place until the method 300 is performed again. In this way, the SCM firmware may not have to be modified repeatedly for the same IO pattern. Rather, the SCM firmware may be modified once and the modified configuration may remain in place, unaltered, for future IO patterns the same, or similar to, the IO pattern(s) that formed the basis for creation of the rules 306.

D. Further Discussion

As will be apparent from this disclosure, example embodiments may implement a variety of useful features and functionalities, although no particular embodiment is required to implement any particular feature or functionality. One example of a feature implemented by some example embodiments is the implementation of permanent changes to SCM firmware. This may be achieved as a result of direct communication between NFIT and the SCM firmware. As another example, embodiments may enable changes to interleave rules specified in an NFIT, so that the way in which data is written to one or more NVDIMMs may be modified as needed. This function may be particularly useful since system software is typically unable to modify interleave rules. As a final example, methods such as that disclosed in FIG. 3 may be performed at runtime to that the method can be run multiple times to identify various different SCM firmware configurations, and the optimum SCM firmware configuration identified based on the runs of the method.

E. Further Example Embodiments

Following are some further example embodiments of the invention. These are presented only by way of example and are not intended to limit the scope of the invention in any way.

Embodiment 1. A method, comprising: analyzing an IO pattern comprising IOs issued by a client application; based on the analyzing, generating a rule relating to an NFIT; using the rule to modify the NFIT; and after the NFIT is modified, changing a configuration of SCM firmware based on the NFIT.

Embodiment 2. The method as recited in embodiment 1, wherein the change in the configuration of the SCM firmware is persistent until the NFIT is modified again.

Embodiment 3. The method as recited in any of embodiments 1-2, wherein the analyzing comprises analyzing the IO pattern as the IOs are issued by the application.

Embodiment 4. The method as recited in any of embodiments 1-3, wherein the IO pattern comprises IOs predicted to be issued by the application.

Embodiment 5. The method as recited in any of embodiments 1-4, wherein SCM with which the SCM firmware is associated is accessible by one or more of a memory mode, a storage mode, and an app-direct mode.

Embodiment 6. The method as recited in any of embodiments 1-5, wherein SCM with which the SCM firmware is associated comprises one or more NVDIMMs.

Embodiment 7. The method as recited in any of embodiments 1-6, wherein using the rule to modify the NFIT comprises modifying an interleave set structure of the NFIT.

Embodiment 8. The method as recited in any of embodiments 1-7, wherein using the rule to modify the NFIT comprises modifying an SPA range structure and/or a block data window region structure.

Embodiment 9. The method as recited in any of embodiments 1-8, wherein using the rule to modify the NFIT comprises modifying an interleave structure.

Embodiment 10. The method as recited in any of embodiments 1-9, wherein data of the IO pattern is in a form of block data, or in a form of a byte stream.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, NVDIMM, CD-ROM, flash memory, phase-change memory ("PCM"), SCM, or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
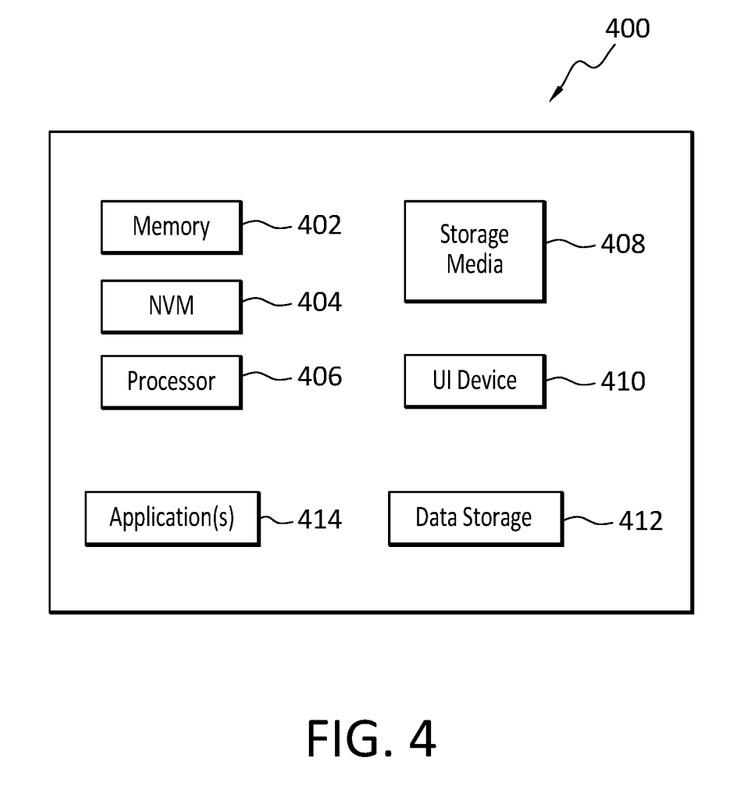
FIG. 4 discloses aspects of an example computing entity operable to perform any of the claimed methods, operations, and processes.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM, and NVDIMM, for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, by storage class memory (SCM) from an application, inputs/outputs (IOs);
   analyzing the IOs to identify an IO pattern in the IOs, and the analyzing reveals that the identified IO pattern that comprises either a byte stream, or one or more individual blocks of data;
   based on the identified IO pattern, generating an IO pattern-specific rule, which is specific to the identified IO pattern, relating to a Non-Volatile Dual Inline Memory Module (NVDIMM) firmware interface table (NFIT);
   using the IO pattern-specific rule to modify the NFIT; and
   updating a configuration of SCM firmware based on the modified NFIT so that an IO having the identified IO pattern is permanently handled based on the IO pattern-specific rule at the SCM.

2. The method as recited in claim 1, wherein the update in the configuration of the SCM firmware is persistent until the NFIT is modified again.

3. The method as recited in claim 1, wherein the analyzing comprises analyzing the IOs as they are issued by the application.

4. The method as recited in claim 1, wherein the analyzing is performed using an actual IO pattern, or a predicted IO pattern.

5. The method as recited in claim 1, wherein the SCM with which the SCM firmware is associated is accessible by one or more of a memory mode, a storage mode, and an app-direct mode.

6. The method as recited in claim 1, wherein the SCM with which the SCM firmware is associated comprises one or more NVDIMMs.

7. The method as recited in claim 1, wherein using the IO pattern-specific rule to modify the NFIT comprises modifying an interleave set structure of the NFIT.

8. The method as recited in claim 1, wherein using the IO pattern-specific rule to modify the NFIT comprises modifying a system physical address (SPA) range structure and/or a block data window region structure.

9. The method as recited in claim 1, wherein using the IO pattern-specific rule to modify the NFIT comprises modifying an interleave structure.

10. A computer readable storage medium having stored therein instructions that are executable by one or more hardware processors to perform operations comprising:
    receiving, by storage class memory (SCM) from an application, inputs/outputs (IOs);
    analyzing the IOs to identify an IO pattern in the IOs, and the analyzing reveals that the IO pattern is either a byte stream, or one or more individual blocks of data;
    based on the identified IO pattern, generating an IO pattern-specific rule, which is specific to the identified IO pattern, relating to a Non-Volatile Dual Inline Memory Module (NVDIMM) firmware interface table (NFIT);
    using the IO pattern-specific rule to modify the NFIT; and
    updating a configuration of SCM firmware based on the modified NFIT so that an IO having the identified IO pattern is permanently handled based on the IO pattern-specific rule at the SCM.

11. The computer readable storage medium as recited in claim 10, wherein the update in the configuration of the SCM firmware is persistent until the NFIT is modified again.

12. The computer readable storage medium as recited in claim 10, wherein the analyzing comprises analyzing the IOs as they are issued by the application.

13. The computer readable storage medium as recited in claim 10, wherein the analyzing is performed using an actual IO pattern, or a predicted IO pattern.

14. The computer readable storage medium as recited in claim 10, wherein the SCM with which the SCM firmware is associated is accessible by one or more of a memory mode, a storage mode, and an app-direct mode.

15. The computer readable storage medium as recited in claim 10, wherein the SCM with which the SCM firmware is associated comprises one or more NVDIMMs.

16. The computer readable storage medium as recited in claim 10, wherein using the IO pattern-specific rule to modify the NFIT comprises modifying an interleave set structure of the NFIT.

17. The computer readable storage medium as recited in claim 10, wherein using the IO pattern-specific rule to modify the NFIT comprises modifying a system physical address (SPA) range structure and/or a block data window region structure.

18. The computer readable storage medium as recited in claim 10, wherein using the IO pattern-specific rule to modify the NFIT comprises modifying an interleave structure.

* * * * *